(12) United States Patent
Hill et al.

(10) Patent No.: US 7,201,062 B2
(45) Date of Patent: Apr. 10, 2007

(54) DEVICE FOR MEASURING THE TENSION IN A CONTINUOUS CHAIN WITH LINK ENDS

(75) Inventors: Nigel Hill, Worcester (GB); John Tout, Worcester (GB)

(73) Assignee: Joy MM Delaware, Inc., Wilmington, DE (US)

( * ) Notice: Subject to any disclaimer, the term of this patent is extended or adjusted under 35 U.S.C. 154(b) by 85 days.

(21) Appl. No.: 11/064,331

(22) Filed: Feb. 23, 2005

(65) Prior Publication Data
US 2005/0189200 A1 Sep. 1, 2005

(51) Int. Cl.
*G01N 3/08* (2006.01)
(52) U.S. Cl. ....................................... 73/828
(58) Field of Classification Search ............... 73/828
See application file for complete search history.

(56) References Cited

U.S. PATENT DOCUMENTS 4,457,212 A * 7/1984 Unger et al. ................... 92/18
5,033,315 A * 7/1991 Merten et al. ......... 73/862.391
5,167,159 A * 12/1992 Lucking ................. 73/862.451
5,207,108 A * 5/1993 Tassic .................... 73/862.391

FOREIGN PATENT DOCUMENTS

| GB | 1426965 | * | 3/1976 |
| GB | 1426965 | A | 3/1976 |
| GB | 2162329 | A | 6/2006 |
| PL | 173419 | B1 | 3/1994 |
| SU | 866426 | A | 9/1981 |

\* cited by examiner

*Primary Examiner*—Max Noori
(74) *Attorney, Agent, or Firm*—James Earl Lowe, Jr.

(57) ABSTRACT

A device adapted for pulling the ends of a continuous chain together, with each chain end including a link, in order to measure the tension in the chain. The device comprises a first straight section, a second straight section, and a third section that is connected to the first straight section to form an L shaped piece. The device also includes a fourth section connected to one of the first and second straight sections to form an L shaped piece, and means for pinning the four sections together, so that the device surrounds the chain end links so that the ends of the chain can be pulled together to measure the tension in the chain.

19 Claims, 3 Drawing Sheets

DEVICE FOR MEASURING THE TENSION IN A CONTINUOUS CHAIN WITH LINK ENDS

BACKGROUND OF THE INVENTION

This invention relates to a device for measuring the tension in a continuous chain with link ends. In order to take slack out of the chain used on a chain conveyor, and to avoid loose chain causing excess wear or damage to the chain or conveyor, a chain is often pulled tight or pre-tensioned before the chain conveyor is operated. As the chain is pulled or tensioned, extra links are removed from the chain. After the chain links are removed, the chain tension or pre-tension is again measured. Preferably, the chain is pre-tensioned to between 5 and 15 tons.

To measure the tension, a heavy device that fits over the top of the chain has been used. It clamps two horizontal links, with a hydraulic ram between the clamps, and the hydraulic fluid pressure in the rams is measured. Drawbacks of the present device include that it takes more than one man to carry the device (it weighs about 75 kg or 165 pounds), and because of its size, it is difficult to position and operate.

SUMMARY OF THE INVENTION

One of the principal objects of the invention is to provide a chain tension-measuring device that can be carried by one man, and assembled and used by one man.

Another of the principal objects of the invention is to provide a chain tension-measuring device that extends, in part, through the chain links in order to reduce the likelihood of the device slipping off of the chain.

More particularly, this invention provides a device adapted for pulling the ends of a continuous chain together, with each chain end including a link, in order to measure the tension in the chain. The device comprises a first straight section, a second straight section, and a third section that is connected to the first straight section to form an L shaped piece. The device also includes a fourth section connected to one of the first and second straight sections to form an L shaped piece, and means for pinning the four sections together, so that the device surrounds the chain end links so that the ends of the chain can be pulled together to measure the tension in the chain.

Figure 1:
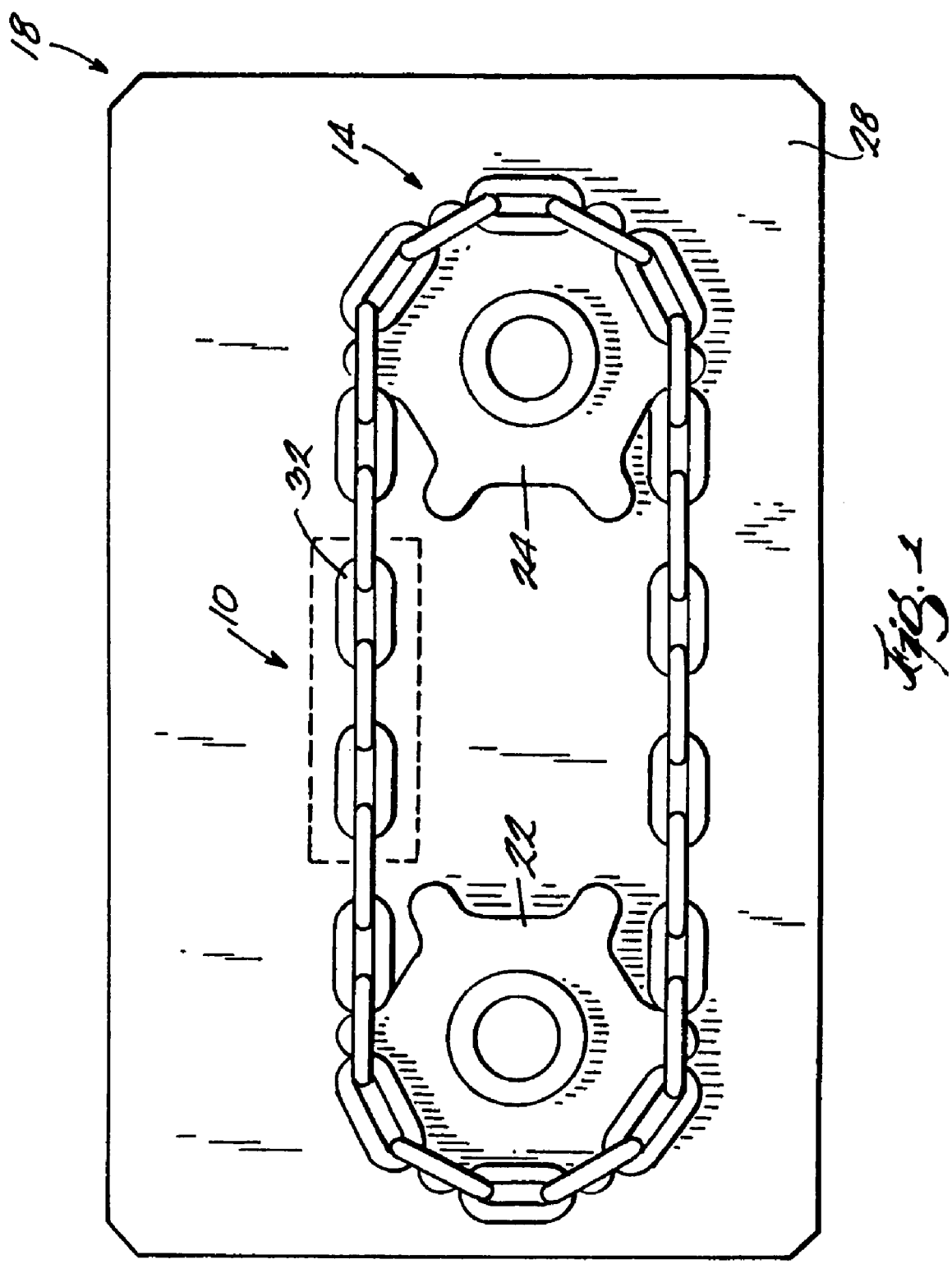
FIG. 1 is a schematic illustration of a conveyor including a continuous chain wound around two sprockets supported by a conveyor frame.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience in reference to the drawings and are not to be construed as limiting terms.

DETAILED DESCRIPTION OF THE PREFERRED EMBODIMENT

As illustrated schematically in FIG. 1, a device 10 is adapted to be used to measure the tension in a continuous chain 14. More particularly, the device 10 can be used with a chain conveyor 18 including a frame 28, two sprockets 22 and 24 mounted on the frame 28, with the chain 14 being trained around and over the sprockets 22 and 24.

Figure 2:
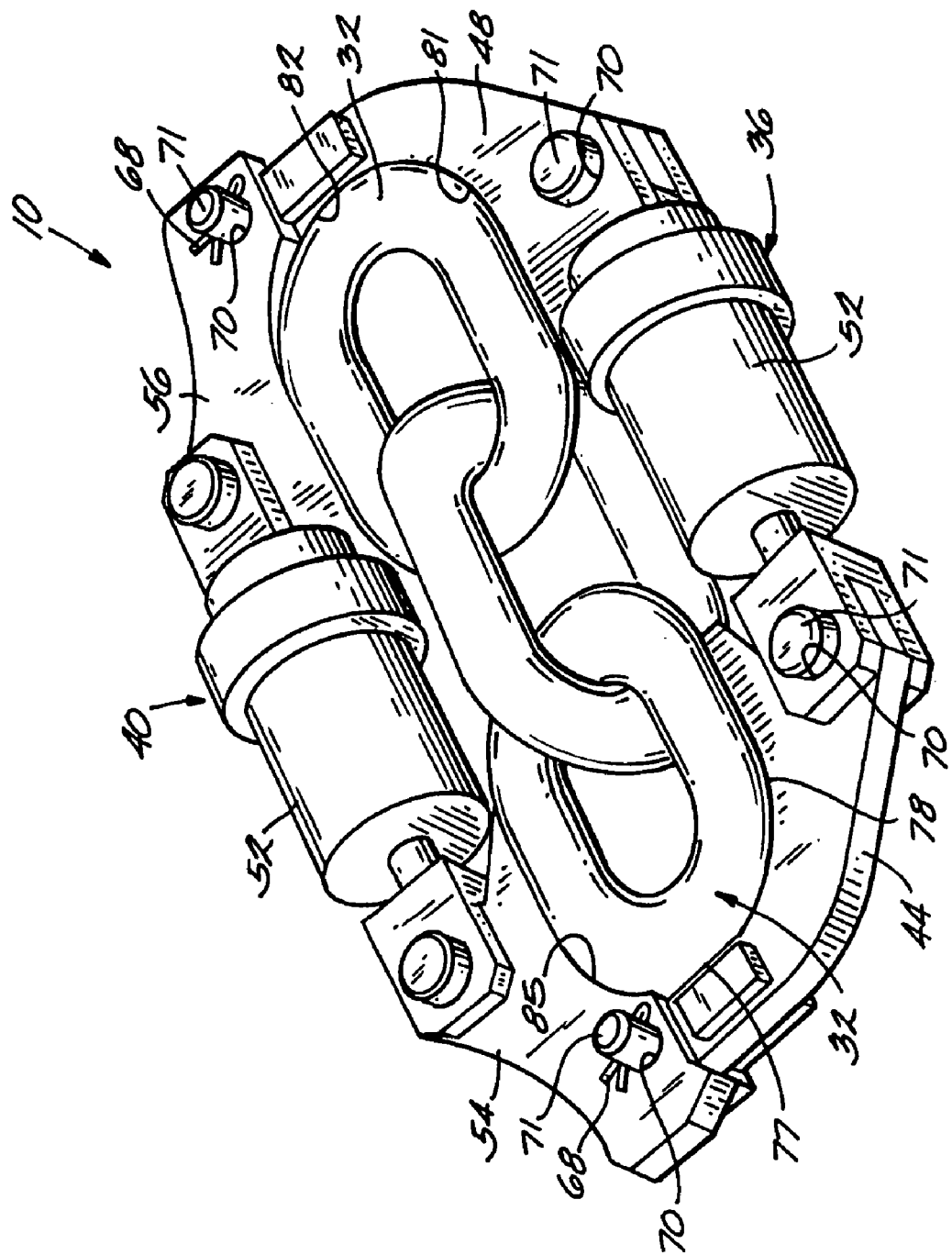
FIG. 2 is a perspective view of a tension-measuring device in accordance with this invention secured around the end links of a continuous chain, only with all but the end links, and a connecting vertical link, that connects the end links, removed.
Figure 3:
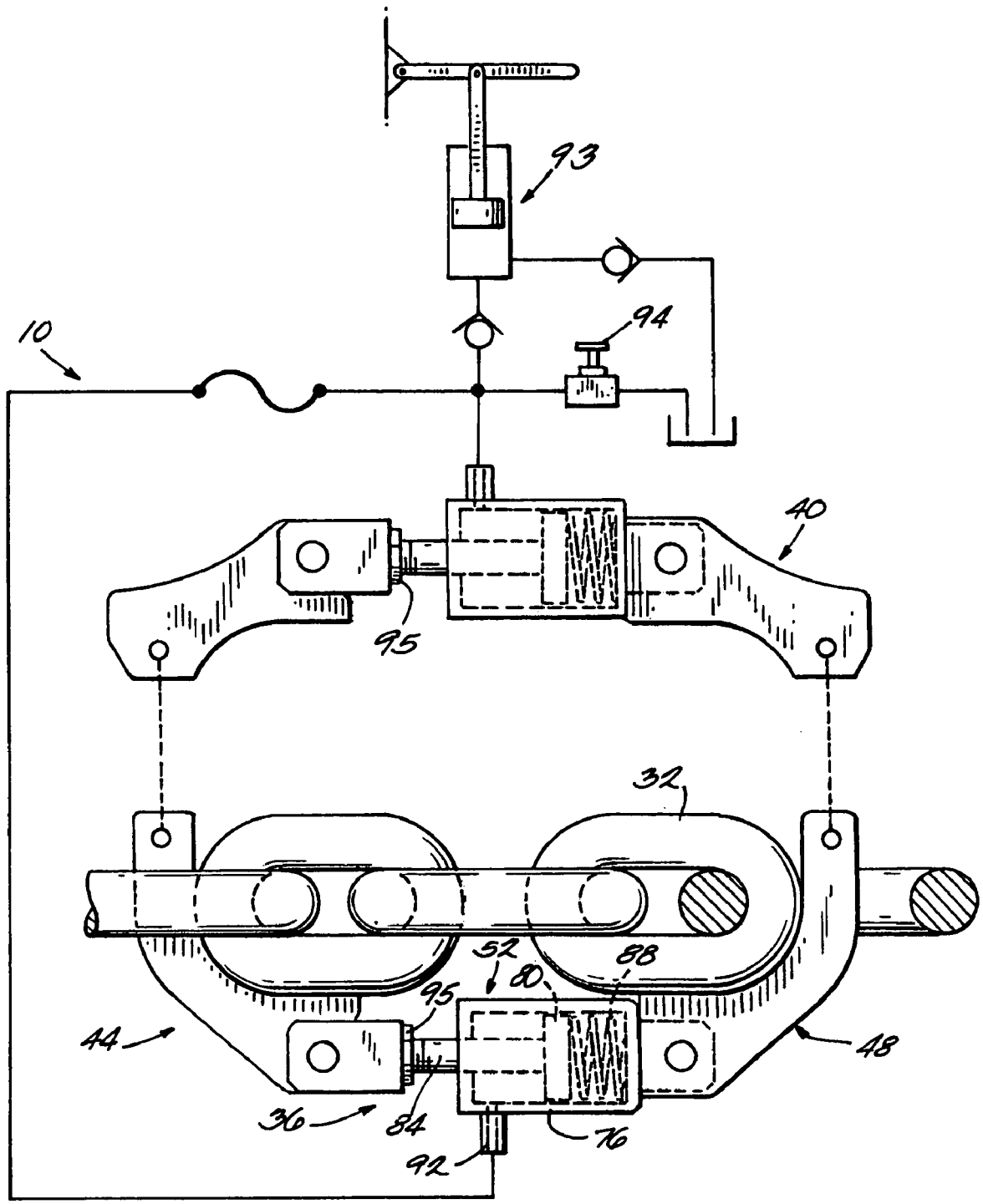
FIG. 3 is a top view of the tension measuring device, shown disassembled, illustrating the internal piston and spring of the rams, and the use of a hand pump for operating the rams, and a gauge for measuring the fluid pressure in the rams.

Still more particularly, as shown in FIGS. 2 and 3, the device 10 is adapted for pulling the ends of the continuous chain 14 together, with each chain end including a link 32, in order to measure the tension in the chain 14. The device 10 comprises a first straight section 36, a second straight section 40, and a third section 44 that is connected to the first straight section 36 to form an L shaped piece. The device 10 also includes a fourth section 48 connected to one of the first and second straight sections to form an L shaped piece and means for pinning the four sections together, so that, when the four sections are pinned together, the device 10 surrounds the chain end links 32 so that the ends of the chain can be pulled together to measure the tension in the chain 14. More particularly, in the preferred embodiment, the third and fourth sections 44 and 48, respectively, are pinned to the first section 36 to form an L shape at each end of the first section 36, or a U shape overall.

The device 10 further comprises one of the straight sections including means for drawing the third and fourth sections toward each other. More particularly, the drawing means comprises a hydraulic ram 52 that pulls the third and fourth sections 44 and 48, respectively, toward each other to pull the ends of the chain 14 together. In other embodiments (not shown), other devices, such as a turnbuckle, can be used in place of the hydraulic ram. Further, in the preferred embodiment, there is a hydraulic ram 52 included in each of the first and second sections 36 and 40, respectively. In other embodiments (not shown), only one ram can be used. In the preferred embodiment, the second straight section 40 includes the hydraulic ram 52, and a first end piece 54 and a second end piece 56.

More particularly, the ends of each of the first and second sections have a hole 70, and a pin 71 is received in the hole 70. Still more particularly, in the preferred embodiment, the third and fourth sections 44 and 48, respectively, are permanently pinned to the first section 36, and the second section 40 is removably pinned to the third and fourth sections 44 and 48, respectively, by the use of a cotter pin 68 attached to its respective pin. In other embodiments (not shown), other means for removably securing the pins 71 in the second section 40 can be used. As can be seen in FIG. 3, the third and fourth sections 44 and 48, respectively, extends through a respective vertical chain link. This reduces the likelihood of the device 10 slipping off of the chain 14.

Still more particularly, as shown in FIG. 3, the device is adapted to be used with a continuous chain including at least five serially interconnected links. The first and fifth links each have an opening through the link, each opening being completely surrounded by the link.

Since the second section 40 is removably pinned to the third 44 and fourth 48 sections, when unpinned, as shown in FIG. 3, the third section 44 can pass through the opening in the first link, and the fourth section 48 can pass through the opening in the fifth link. Then the third 44 and fourth 48 sections can be pinned to the second section 40 so that the device 10 is held within the continuous chain 14.

As can be seen in FIGS. 2 and 3, each link has an end 77 and a side 78, and each of the third and fourth sections is curved, with a first part 81 of each section engaging substantially the entire side 78 of each link 32 and with a second part 82 of each section engaging the end 77 of each link. By engaging both the side and the end of the links 32, stresses on the tension-measuring device 10 are reduced. Further, by loading against the side of the links 32, the tension-measuring device 10 is lighter than a device that doesn't engage the side of the links 32. Still more particularly, each end of the second section 40 includes an indentation 85 that receives a link 32 so that the indentation 85 engages substantially the entire side of the link and the end of the link in a similar fashion and for the same reasons as the curved third and fourth sections. In other embodiments (not shown), the third and fourth sections 44 and 48, respectively, can be made of flexible material, such as braided rope.

As shown schematically in FIG. 3, the hydraulic ram 52 includes a piston housing 76, and a piston 80 slidably received in the piston housing 76. The piston 80 has a stem portion 84 that extends out of one end of the piston housing 76. The hydraulic ram 52 further includes means for biasing the ram 52 in its extended direction. In the preferred embodiment, the biasing means comprises a spring 88 located in the piston housing 76 between the piston 80 and the other end of the piston housing 76. In other embodiments (not shown), a double-acting type cylinder, with appropriate valves, can be used instead of the hydraulic ram 52 and spring 88.

As illustrated schematically in FIG. 3, the device 10 further includes a two way valve 92 in fluid communication with one side of the hydraulic ram housing 76 so that, when pumped with hydraulic fluid, the ram 52 contracts. Still more particularly, the device 10 includes a hand pump 93 for operating the rams 52, and a gauge 94 for measuring the fluid pressure in the rams 52.

As shown in FIGS. 2 and 3, the device 10 further includes means for adjusting the length of each of the first and second sections 36 and 40, respectively. More particularly, such length adjusting means comprises a turnbuckle 95 threaded between the end of its respective section and its connection to the hydraulic ram 52.

In the preferred embodiment, the tension-measuring device 10 of this invention weighs about 45 kg or under 100 pounds, and one man can easily carry the device 10.

Various other features and advantages of the invention will be apparent from the following claims.

The invention claimed is:

1. A device adapted for pulling the ends of a continuous chain together, in order to measure the tension in the chain, the continuous chain including at least five serially interconnected links the first and fifth links each have an opening through the link, each opening being completely surrounded by the link, the device comprising
    a first straight section,
    a second straight section,
    a third section that is connected to the first straight section to form an L shaped piece, and a fourth section connected to one of the first and second straight sections to form an L shaped piece, and means for pinning the four sections together, so that the device surrounds the chain end links so that the ends of the chain can be pulled together to measure the tension in the chain,
    wherein the second section is removably pinned to the third and fourth sections, so that, when the third and fourth sections are unpinned from the second section, the third section can pass through the opening in the first link, and the fourth section can pass through the opening in the fifth link, so that when the third and fourth sections are again pinned to the second section, the device is held within the continuous chain.

2. A device in accordance with claim 1 wherein one of the straight sections includes means for drawing the third and fourth sections toward each other.

3. A device in accordance with claim 2 wherein the drawing means comprises a hydraulic ram that pulls the third and fourth sections toward each other to pull the ends of the chain together.

4. A device in accordance with claim 3 wherein the hydraulic ram is in said first straight section.

5. A device in accordance with claim 1 wherein the third and fourth sections are permanently pinned to the first section.

6. A device in accordance with claim 3 wherein the hydraulic ram is spring biased to extend, and when the hydraulic ram is pumped with hydraulic fluid, the ram contracts.

7. A device in accordance with claim 1 wherein there is a hydraulic ram in said second straight section.

8. A device in accordance with claim 1 wherein each chain end includes a link, and the link has an end and a side, and wherein each of the third and fourth sections is curved, with part of each section engaging substantially said entire side of said link and said end of said link.

9. A device in accordance with claim 1 wherein said second section has two ends, and each end includes an indentation that receives a link so that said indentation engages substantially the entire side of the link and the end of the link.

10. A device adapted for pulling the ends of a continuous chain together, with each chain end including a link having a side and an end, in order to measure the tension in the chain, the device comprising
    a first straight section,
    a second straight section,
    a third section that is connected to the first straight section to form an L shaped piece, and a fourth section connected to one of the first and second straight sections to form an L shaped piece, and means for pinning the four sections together, and so that the device surrounds and contacts substantially the entire link side and the link end so that the ends of the chain can be pulled together to measure the tension in the chain.

11. A device in accordance with claim 10 wherein there is a hydraulic ram in said first straight section.

12. A device in accordance with claim 10 wherein the third and fourth sections are permanently pinned to the first section.

13. A device in accordance with claim 10 wherein the second section is removably pinned to the third and fourth sections.

14. A device in accordance with claim 10 wherein each of the third and fourth sections is curved, with part of each section engaging substantially the entire side of said link and said end of said link.

15. A device in accordance with claim 10 wherein said second section has two ends, and each end includes an indentation that receives a link so that said indentation engages substantially the entire side of the link and the end of the link.

16. A device in accordance with claim 10 wherein there is a hydraulic ram in said second straight section.

17. A device in accordance with claim 16 wherein the hydraulic ram is spring biased to extend, and when the hydraulic ram is pumped with hydraulic fluid, the ram contracts.

18. A device in accordance with claim 10 wherein one of the straight sections includes means for drawing the third and fourth sections toward each other.

19. A device in accordance with claim 18 wherein the drawing means comprises a hydraulic ram that pulls the third and fourth sections toward each other to pull the ends of the chain together.

\* \* \* \* \*